United States Patent [19]

Durivault et al.

[11] Patent Number: 4,526,336

[45] Date of Patent: Jul. 2, 1985

[54] ORIENTABLE PIVOT IN PARTICULAR FOR A TELEVISION SET

[75] Inventors: Jean Durivault; Bernard Branche, both of Vierzon, France

[73] Assignee: Nadella, Rueil Malmaison, France

[21] Appl. No.: 550,963

[22] Filed: Nov. 10, 1983

[30] Foreign Application Priority Data

Nov. 10, 1982 [FR] France .................. 82 18898

[51] Int. Cl.³ .......................................... A47B 95/00
[52] U.S. Cl. .................................................. 248/349
[58] Field of Search .............. 248/349, 131, 415, 418, 248/183, 186; 108/139, 142, 94, 103; 312/305, 11, 125, 197; 297/349; 308/230, 231, 234; 384/300

[56] References Cited

U.S. PATENT DOCUMENTS

| 559,161 | 4/1896 | Brower | 108/103 |
| 656,726 | 8/1900 | Pope | 308/230 |
| 921,216 | 5/1909 | Fisher | 308/230 |
| 1,334,958 | 3/1920 | McEwen | 248/349 |
| 2,237,281 | 4/1941 | Diesbach | 248/183 |
| 2,351,293 | 6/1944 | Saunders | 248/349 |
| 2,830,862 | 4/1958 | Wright . | |
| 2,905,421 | 9/1959 | O'Connor | 248/183 |
| 3,193,335 | 7/1965 | Wing | 384/300 |
| 3,396,932 | 8/1968 | Slaga | 248/349 |
| 3,615,068 | 10/1971 | Edelstein | 248/349 |
| 4,191,437 | 3/1980 | Funke | 108/94 |
| 4,277,118 | 7/1981 | McCloskey | 384/300 |
| 4,351,383 | 9/1982 | Gladwin | 384/300 |

FOREIGN PATENT DOCUMENTS

| 27184 | 2/1921 | Denmark | 308/230 |
| 728006 | 11/1942 | Fed. Rep. of Germany | 108/139 |
| 1362637 | 4/1964 | France . | |
| 1500141 | 11/1967 | France . | |
| 1597029 | 7/1970 | France . | |
| 2330949 | 3/1977 | France . | |
| 935448 | 8/1963 | United Kingdom | 308/230 |
| 1231388 | 5/1971 | United Kingdom | 248/349 |

Primary Examiner—William H. Schultz
Assistant Examiner—Robert A. Olson
Attorney, Agent, or Firm—Robert E. Burns; Emmanuel J. Lobato; Bruce L. Adams

[57] ABSTRACT

The pivot comprises a case 1 and a support plate 4 rotatively mounted in the case by means of two series of rolling elements 5, 8 disposed on each side of the support plate 4 adjacent to the periphery of the latter. A braking device 12, 13 is provided for braking the support plate 4 relative to the case 1.

7 Claims, 2 Drawing Figures

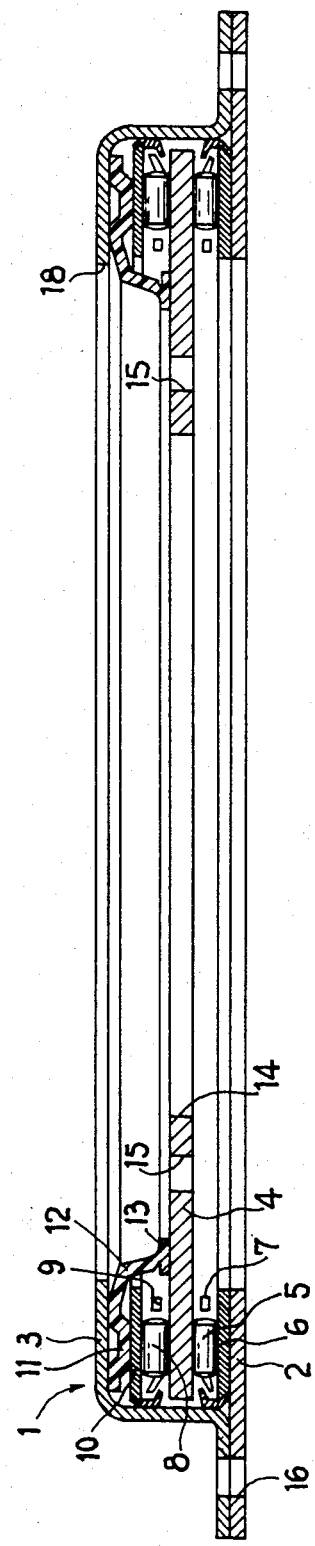
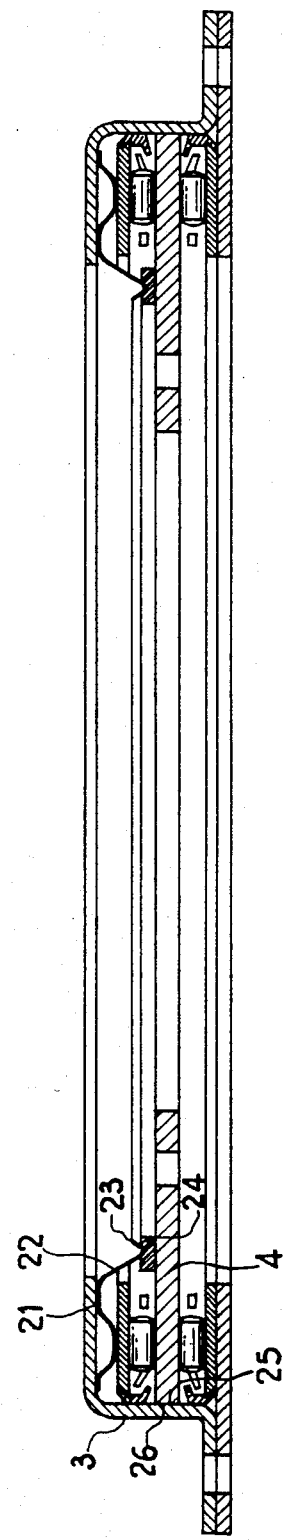

ORIENTABLE PIVOT IN PARTICULAR FOR A TELEVISION SET

The present invention relates to a pivot in particular for a television set and more particularly to an orientable pivot.

Television sets are often placed on orientable pieces of furniture specially designed for this purpose such as tables mounted on castors.

Such tables do not always have an appearance which is in harmony with the decoration of the room in which the television set is placed.

Further, they are relatively space-consuming and expensive.

An object of the invention is to provide an orientable pivot which is has a small overall size and is cheap and easy to mount.

The invention provides an orientable pivot, in particular for a television set, comprising a case and a support plate rotatively mounted in said case by means of two series of rolling elements disposed on each side of the support plate on the periphery of the support plate, the pivot further comprising means for braking the support plate relative to the case.

Further features of the invention will be apparent from the following description with reference to the accompanying drawing which is given merely by way of example and in which:

FIG. 1 is a sectional view of a first embodiment of an orientable pivot according to the invention, and FIG. 2 is a view similar to FIG. 1 of another embodiment of the orientable pivot according to the invention.

The orientable pivot shown in FIG. 1 mainly comprises a case 1 having an annular base member 2 and a hollow cover 3 adapted to be fixed to the base member 2.

Mounted in the case arranged in this way is a rotatable annular metal support plate 4. The plate 4 is mounted in the case by means of a first series of rolling elements 5 in the form of needles or rollers which are disposed between the lower surface of the support plate 4 and a raceway 6 which is in contact with the base member 2. The needles 5 are maintained in a cage 7. The upper surface of the support plate 4 is in contact with a second series of rolling elements 8 such as needles or rollers mounted in a cage 9. A raceway 10 is maintained in contact with the rollers 8 by means of a flexible member 11 interposed between the raceway 10 and the wall of the hollow cover 3. The resilient member 11 is made from polyamide. It produces for the assembly a certain pre-stressing and thus eliminates any play between the various component elements of the pivot. The resilient member 11 has an axially extending lip 12 which is in sliding contact with the support plate 4. In the embodiment shown in FIG. 1, this lip 12 terminates in an annular shoe 13 which rubs against the upper surface of the support plate 4.

Thus, in addition to taking up the play mentioned before, the resilient member 11 performs the function of a sealing element and a brake which hinders rotation of the plate 4 relative to the case 1 of the pivot in all angular positions of the plate 4.

The support plate 4 has a central opening 14 and apertures 15 for fixing an intermediate element (not shown) such as for example a spacer element or a column connected to a television set.

The plate 2 forming the base and the cover 3 of the case 1 have peripheral flanges in which apertures 16 are formed for fixing the pivot to a fixed support.

The cover 3 is fixed to the base 2 by spot-welding between the fixing apertures 16. Thus, the resilient member 11 is pre-stressed when this spot-welded assembly is achieved.

The cover 3 has a central opening 18 of large diameter for the passage of the intermediate connecting element between the support plate 4 and the television set to be supported.

The orientable pivot for a television set shown in FIG. 2 is similar to that shown in FIG. 1 except for the flexible member for taking up play.

In the embodiment shown in FIG. 2, this flexible member 21 is a metal member of steel or spring bronze. The axially extending lip 22 of the flexible member 21 terminates in a flange 23 and a ring 24 of a material having an appropriate coefficient of friction, for example of the type employed in brake linings, is interposed between the flange 23 and the upper surface of the support plate 4.

Further, in order to eliminate any radial play between the support plate 4 and the cover 3, the diameter of the plate 4 is so chosen as to be fitted in the cover 3 with a minimum amount of clearance.

A radial bearing function is performed by the cooperation of the surface 25 of the edge of the plate 4 and the surface 26 of the cover 3, which may receive suitable treatments if required.

The orientable pivots for a television set just described enable the television set supported thereby to be easily pivoted. This is achieved owing to the use of a thrust bearing formed by the plate 4, the two series of rolling elements 5 and 8 and the raceways 6 and 10.

Further, the presence of braking means permits the obtainment of good stability of the position of the television set and avoids any change in position of the television set upon the least disturbance in the environment of the set.

In the embodiments just described, the plate 4 is adapted to be fixed to the television set to be supported.

However, it is possible to envisage a reverse arrangement in which the case 1 would be secured to the television set or to an intermediate element while the plate 4 would be secured to a fixed support.

In this case, the flexible member for taking up play and exerting a braking action would be mounted between the plate 2 forming the base and the raceway 6.

What is claimed is:

1. An orientable pivot in particular for a television set, comprising a case, a support plate parallel to and spaced from said case, mounting means comprising two series of rolling elements disposed on each side of said support plate adjacent to an outer peripheral edge of said support plate between said support plate and said case for rotatively mounting said support plate relative to said case, said case support plate and said series of rolling elements being coaxial, and combined resiliently yieldable means for taking up axial play between said case and said support plate and for braking said support plate relative to the case, said resiliently yieldable means being in an axially stressed condition between said case and said support plate and in rubbing contact with said support plate.

2. An orientable pivot in particular for a television set, said pivot comprising a case, a support plate parallel to and spaced from said case, mounting means comprising two series of rolling elements disposed on each side of said support plate adjacent to an outer peripheral edge of said support plate, a first raceway and a second raceway, a first series of said series of rolling elements being disposed between a first surface of said support plate and said first raceway and a second series of said series of rolling elements being disposed between a second surface of said support plate opposed to said first surface and said second raceway, said support plate, said case and said raceways being coaxial, a flexible member for taking up play being disposed between said case and one of said first and second raceways, and braking means for braking said support plate relative to said case and comprising a substantially axially extending lip of said flexible member, which lip is in sliding contact with a surface of said support plate.

3. An orientable pivot according to claim 2, wherein said flexible member is of plastics material and said lip terminates in a shoe which is in rubbing relation to the surface of said support plate.

4. An orientable pivot according to claim 3, wherein said flexible member is of spring steel and said lip terminates in a flange, a ring of a material having an appropriate coefficient of friction being interposed between said flange and the surface of the support plate.

5. An orientable pivot according to claim 3, wherein said flexible member is of spring bronze and said lip terminates in a flange, a ring of a material having an appropriate coefficient of friction being interposed between said flange and the surface of the support plate.

6. An orientable pivot according to claim 1, wherein said case includes a base member and a hollow round cover, said support plate being round and having a diameter which is such that said support plate extends with minimum clearance into said cover, said support plate having an edge surface which cooperates with a confronting surface of said cover so as to form a radial bearing.

7. An orientable pivot according to claim 1, wherein said combined resiliently yieldable means for taking up axial play and braking said support plate has a continuous annular portion which is disposed radially inwardly of the series of rolling elements on an upper side of said support plate and provides a seal between said upper side of said support plate and said case and a protection of said series of rolling elements.

* * * * *